(12) United States Patent
White (10) Patent No.: US 8,355,670 B2
(45) Date of Patent: Jan. 15, 2013

(54) NEAR FIELD COMMUNICATION ADAPTERS

(75) Inventor: Spencer Neil White, Norcross, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 394 days.

(21) Appl. No.: 12/821,034

(22) Filed: Jun. 22, 2010

(65) Prior Publication Data

US 2011/0312270 A1     Dec. 22, 2011

(51) Int. Cl.
*H04B 5/00* (2006.01)
*H05K 1/14* (2006.01)

(52) U.S. Cl. ........ 455/41.1; 455/558; 361/727; 361/737

(58) Field of Classification Search ................ 455/41.1, 455/558; 361/727, 737
See application file for complete search history.

(56) References Cited

U.S. PATENT DOCUMENTS

| | | | |
|---|---|---|---|
| 5,445,525 A * | 8/1995 | Broadbent et al. | 439/64 |
| 5,493,477 A * | 2/1996 | Hirai | 361/737 |
| 5,505,633 A * | 4/1996 | Broadbent | 439/329 |
| 5,708,853 A * | 1/1998 | Sanemitsu | 710/73 |
| 5,736,727 A * | 4/1998 | Nakata et al. | 235/487 |
| 6,330,151 B1 * | 12/2001 | Bates, III | 361/679.02 |
| 6,580,923 B1 * | 6/2003 | Kubo | 455/558 |
| 6,665,544 B1 * | 12/2003 | Michel et al. | 455/558 |
| 7,395,975 B2 * | 7/2008 | Ito | 235/492 |
| 7,856,249 B2 * | 12/2010 | Bloebaum | 455/558 |
| 8,070,057 B2 * | 12/2011 | Jain et al. | 235/380 |
| 2004/0070952 A1 * | 4/2004 | Higuchi et al. | 361/737 |
| 2005/0282583 A1 * | 12/2005 | Kawai et al. | 455/558 |
| 2006/0057892 A1 * | 3/2006 | Bricaud et al. | 439/630 |
| 2006/0226217 A1 * | 10/2006 | Narendra et al. | 235/380 |
| 2007/0117463 A1 * | 5/2007 | Washino et al. | 439/630 |
| 2007/0145135 A1 * | 6/2007 | Jogand-Coulomb et al. | 235/451 |
| 2007/0155430 A1 | 7/2007 | Cheon | |
| 2007/0265033 A1 | 11/2007 | Brostrom | |
| 2008/0090595 A1 | 4/2008 | Liu | |
| 2008/0099559 A1 | 5/2008 | Lo | |
| 2009/0002167 A1 * | 1/2009 | Mosteller | 340/572.1 |
| 2011/0255252 A1 * | 10/2011 | Sloey et al. | 361/752 |

* cited by examiner

*Primary Examiner* — Temesgh Ghebretinsae
*Assistant Examiner* — Gennadiy Tsvey
(74) *Attorney, Agent, or Firm* — Moazzam & Associates, LLC (57) ABSTRACT

Devices and systems are disclosed which relate to enabling NFC communication on devices such as an iPhone. A traditional smart card tray is modified to include contact leads from the inside of the smart card tray to an exterior surface of the smart card tray. Exposed contacts on the external surface provide an outside interface for add-ons. An exemplary add-on is an NFC circuit coupled to or embedded within a mobile device skin. The skin fits snugly around a portion of the mobile device, and includes on one surface contact points that line up with the outside interface of the mobile device. The contact points provide electrical communication between NFC circuitry of the mobile device skin and the smart card within the mobile device. When the skin is worn on the mobile device, the mobile device is NFC enabled. When the skin is removed, the NFC is no longer available.

20 Claims, 8 Drawing Sheets

NEAR FIELD COMMUNICATION ADAPTERS

BACKGROUND OF THE INVENTION

1. Field of the Invention

The present invention relates to near field communication (NFC). In particular, the present invention relates to adding NFC capability to an existing mobile device.

2. Background of the Invention

Mobile devices, such as cellular telephones, have become a common tool of everyday life. Cellular telephones are no longer simply used to place telephone calls. With the number of features available rapidly increasing, cellular telephones, often in the form of a smartphone, are now used for storing addresses, keeping a calendar, reading e-mails, drafting documents, etc. In addition to these uses, mobile devices are now beginning to be used as electronic IDs to uniquely identify a user to a reader or a scanner. For instance, a user can make contactless payments at a point-of-sale (POS) terminal simply by holding a mobile phone up to a scanner. There are several additional applications to such unique electronic identifying.

NFC identification generally utilizes a secure element which holds personal information and an NFC circuit in order to transmit the payment information to a reader. The NFC circuit includes an NFC processor, transceiver/radio, and an antenna, for instance a loop antenna. There are a number of different ways to enable a device to communicate with an NFC reader. For instance, the NFC circuit and the secure element may be embedded in the hardware of the device during its manufacturing process. Alternatively, the mobile device may be enabled through accessories. Such accessories may include a microSD slot or an NFC sticker. An NFC sticker is a miniaturized version of a credit card with the radio frequency (RF) circuit embedded within. The sticker may be adhered to an external surface of the mobile device. However, the NFC sticker does not allow for any electronic communications between that payment technology and the mobile device itself. More specifically, there is no communication between the NFC circuit and the circuitry of the device.

microSD slots have proved to be a popular entry point for accessory based NFC technology enablement whereby the RF circuit and the secure elements for storing payment credentials are fabricated within a microSD card and inserted into a mobile device. This solution essentially retroactively enables that mobile device for contactless payment. While many mobile devices may be enabled using a memory card slot on the mobile device, some devices cannot be enabled this way. For instance, the iPhone™ is unique for a number of different reasons, not the least of which is that the iPhone does not have an external memory slot, such as a microSD slot.

There do exist some accessories that use the iPort connection interface at the bottom of the iPhone. Systems may be created which plug into the bottom of the iPhone and use the iPort as a means to communicate with externally appended NFC circuitry and the internal electronic software on the device. However, such a method requires the user to use an iPort connector that is manufactured exclusively by Apple. The iPort connector also requires that the provider of the accessory get any applications certified or else the iPhone will not operate, with an interrupt error message informing the user of the unauthorized accessory. Further, a connection through the iPort connector provides a fairly bulky component and a solution that plugs into at the bottom of the iPhone would unduly extend the length of the device. In many cases, this length extends beyond the length that customers find appealing. The extension also makes the accessory prone to damage or becoming dislodged through just normal wear and tear or bumping of the iPhone.

Another NFC enablement solution is a Subscriber Identity Module (SIM) enabler. A SIM enabler is essentially a thin film that has electronics embedded in it. One end of the film is in the shape and size of a standard SIM card. The film slides in-between the SIM card and the phone. Appended to the film is a larger piece of the film that houses a RF antennae and the NFC circuitry. The challenge with such a solution is that it requires a traditional SIM card slot for the SIM enabler to fit into the device. In the case of the iPhone, the iPhone has a SIM tray that has very tight tolerances. Even though the thin film of the SIM enabler is quite thin, there is not enough space to have the SIM enabler inserted in with the antennae portion sticking out from the SIM tray.

There are also other challenges with the SIM enabler. For instance, the SIM enabler may move around and some of the electronic contacts can become misaligned and essentially short out the signals that are going between the SIM and the device. This can cause any number of failures. Additionally, the SIM enabler is somewhat unsightly because it may be external to the device. While some devices may hide this under a battery door, the iPhone does not provide such an opportunity because the battery is fully enclosed and is not accessible by the consumer.

Figure 1A:
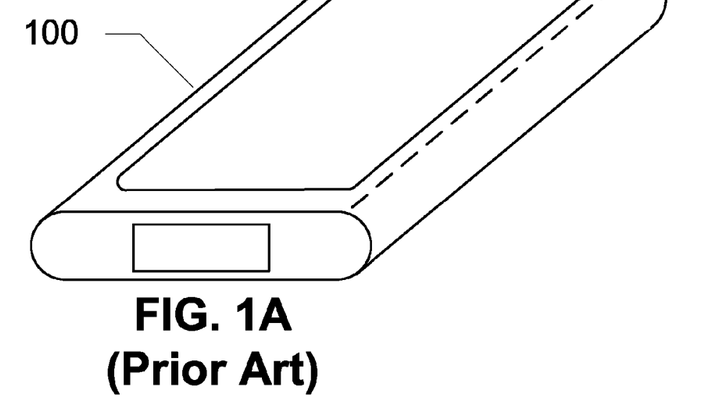
FIGS. 1A-1C show a smart card tray on a mobile device, according to the prior art.
Figures 1B, 1C:
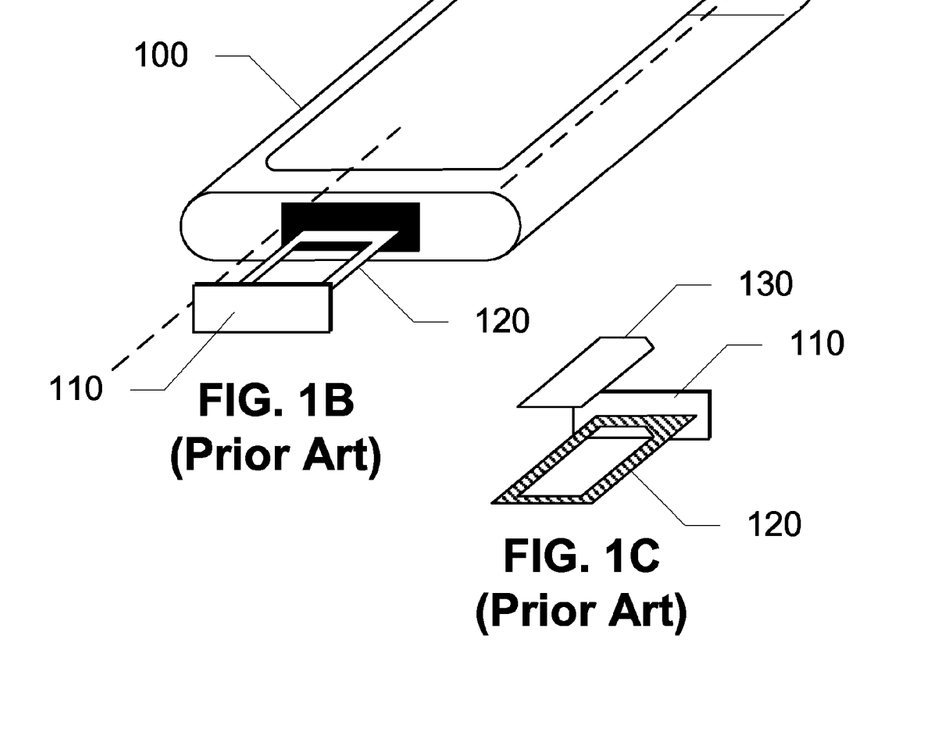

FIGS. 1A-1C show a mobile device with a smart card tray, similar to that of the iPhone. A smart card is inserted into the smart card tray, for instance a SIM tray, and the smart card tray is inserted into the mobile device. The smart card tray fits securely within the communication device, as the mobile device provides for very little clearance on any side of the smart card tray. FIG. 1A shows an exterior panel of a smart card tray completely inserted into mobile device 100. FIG. 1B shows smart card tray partially inserted into mobile device 100. The smart card tray includes a tray portion 120 and an exterior panel 110. FIG. 1C shows the smart card tray from another perspective, and a smart card 130 lined up to be placed in tray 120. Tray 120 is simply a holder with a gap such that the contacts on the bottom surface of smart card 130 are in electrical communication with a smart card interface inside mobile device 100.

What is needed is a way to enable NFC on a device without an external memory slot and with small tolerances around a smart card slot.

SUMMARY OF THE INVENTION

The present invention addresses the above problems of the conventional arts by modifying a smart card tray to include contact leads from the inside of the smart card tray to an exterior surface of the smart card tray. The contact leads do not interfere with the usual communication between the smart card and the mobile device. However, the exposed contacts on the external surface provide an outside interface for add-ons. An exemplary add-on is an NFC circuit coupled to or embedded within a mobile device skin. The skin fits snugly around a portion of the mobile device, and includes on one surface contact points that line up with the outside interface of the mobile device. The contact points provide electrical communication between NFC circuitry of the mobile device skin and the smart card within the mobile device. When the skin is worn on the mobile device, the mobile device is NFC enabled. When the skin is removed, the NFC is no longer available, and other devices can access the SIM card and inner circuitry of the mobile device via the outside interface.

In one exemplary embodiment, the present invention is a near field communication (NFC) adapter for a mobile device, the adapter including a tray for a smart card, the tray having an upper interface adapted to be in electrical communication with the smart card, and a lower interface in electrical communication with the upper interface and adapted to be in electrical communication with a smart card interface on the mobile device, an exterior panel fixedly coupled to the tray, the exterior panel having an outside interface on an outer surface, the outside interface being in electrical communication with the upper and lower interfaces via a plurality of contact leads, and a mobile device skin adapted to removably cover a portion of the mobile device, the mobile device skin including an NFC circuit in electrical communication with electrical contacts on an inner surface of the mobile device skin, wherein the electrical contacts of the mobile device skin are in electrical communication with the outside interface of the mobile device when the mobile device skin is covering the portion of the mobile device. A secure element resides on either the NFC circuit or the smart card in the tray. A memory card interface may be coupled to the mobile device skin, enabling provisioning of the secure element via provisioning logic on a memory card. A user interface on the mobile device enables communication between the secure element and an NFC reader via the NFC circuit on the mobile device skin.

In another exemplary embodiment, the present invention is a device for providing an additional external interface on a mobile device, the device having a tray for a smart card adapted to be inserted into the mobile device, the tray having a top surface and a bottom surface, an upper interface on the top surface adapted to be in electrical communication with the smart card, a lower interface on the bottom surface in electrical communication with the upper interface and with a smart card interface of the mobile device, and an exterior panel coupled to the edge of the tray, the exterior panel having an outside interface on an outer surface, the outside interface being in electrical communication with the upper and lower interfaces via a plurality of contact leads. An external NFC circuit is removably coupled to the outside interface and fixedly coupled to electrical contacts on a mobile device skin, the electrical contacts being adapted to be in electrical communication with the outside interface when the mobile device skin is used on the mobile device. The external NFC circuit further comprises an NFC antenna, an NFC transceiver, and an NFC processor.

In yet another exemplary embodiment, the present invention is a system for near field communication (NFC), including a mobile device having a user interface and a smart card interface, a smart card tray for inserting a smart card into the smart card interface, the smart card tray having an exterior panel, the exterior panel having an outside interface that is in electrical communication with the smart card via contact leads, an NFC circuit fixedly coupled to a mobile device skin, the NFC circuit coming into electrical communication with the outside interface when the mobile device skin is covering a portion of the mobile device, and an NFC reader in wireless communication with the mobile device via the NFC circuit on the mobile device skin.

DETAILED DESCRIPTION OF THE INVENTION

The following detailed description discloses novel devices and systems to enable NFC communication on a mobile device. A traditional smart card tray is modified to include contact leads from the inside of the smart card tray to an exterior surface of the smart card tray. The exposed contacts on the exterior surface provide an outside interface enabling communication with an external NFC apparatus. For instance, an NFC circuit may be coupled to or embedded within a mobile device skin. The skin fits snugly around a portion of the mobile device, contact points on the skin provide electrical coupling with the outside interface of the mobile device. A secure element is included either within the NFC circuitry, or within a smart card inside the mobile device. The outside interface can be used to provision the secure element, and to access other features of the smart card and the mobile device. A user interface enables a user to operate the NFC circuit, identify themselves to an NFC reader, make contactless payments at a POS terminal, etc.

As used herein and throughout this disclosure, the term "mobile device" refers to any electronic device capable of wirelessly sending and receiving data. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories). A mobile device also includes an interface for a smart card, such as a Subscriber Identity Module (SIM) card. Smart cards have their own microprocessors, memory and logic.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a wireless network, or a wireline network. A "network" can include broadband wide-area networks, local-area networks, and personal area networks. Communication across a network is preferably packet-based; however, radio and frequency/amplitude modulations networks can enable communication between communication devices using appropriate analog-digital-analog converters and other elements. Examples of radio networks include Wi-Fi and BLUETOOTH® networks, with communication being enabled by hardware elements called "transceivers." For instance, a contactless integrated circuit card (CICC) has an RFID transceiver, operated by a processor and communicating via an RFID antenna, such as a loop antenna. Mobile devices may have more than one transceiver, capable of communicating over different networks. For example, a cellular telephone can include a GPRS transceiver for communicating with a cellular base station, a Wi-Fi transceiver for communicating with a Wi-Fi network, and a BLUETOOTH® transceiver for communicating with a BLUETOOTH® device.

A network typically includes a plurality of elements that host logic for performing tasks on the network. In modern packet-based wide-area networks, servers may be placed at several logical points on the network. Servers may further be in communication with databases and can enable communication devices to access the contents of a database. For instance, a billing server hosts or is in communication with a database hosting an account for a user of a mobile device. The "user account" includes several attributes for a particular user, including a unique identifier of the mobile device(s) owned by the user, relationships with other users, call data records, bank account information, etc. A billing server may refer to other servers on different networks to update a user account.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figure 2A:
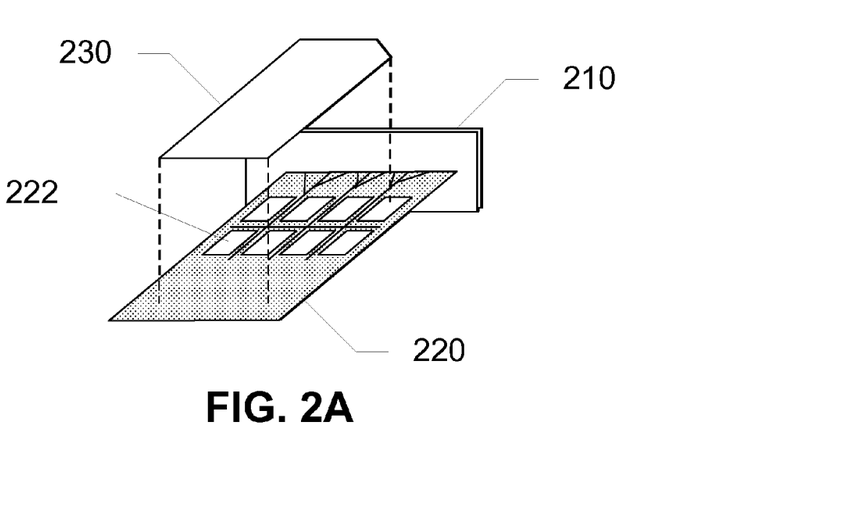
FIGS. 2A-2C show a smart card tray, according to an exemplary embodiment of the present invention.
Figure 2B:
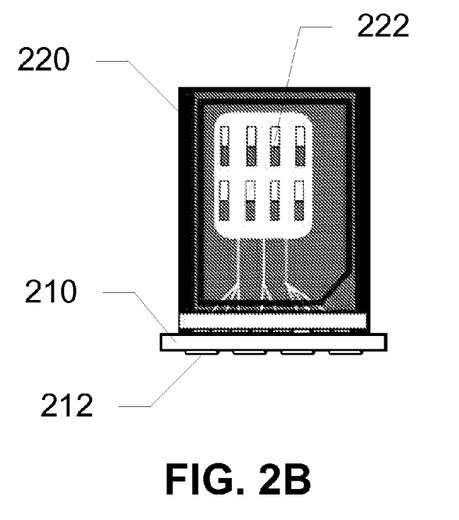
Figure 2C:
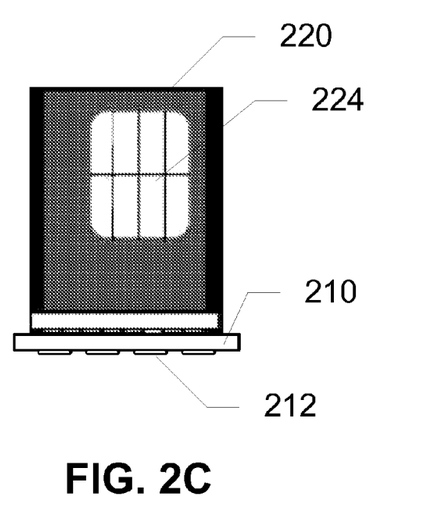

FIGS. 2A-2C show a smart card tray, according to an exemplary embodiment of the present invention. FIG. 2A shows a smart card tray and a smart card 230, according to an exemplary embodiment of the present invention. In this embodiment, smart card 230 is a SIM card being placed onto the smart card tray. The smart card tray includes a tray portion 220 with an upper interface including contacts 222 which communicate with smart card 230 and a lower interface which communicates with a mobile device when inserted into the mobile device. The lower interface appears to the mobile device as if it were a smart card itself. The smart card tray also includes an exterior panel 210 including external contact points 212 which are in electrical communication with the upper and lower interfaces. External contact points 212 are used, for instance, to connect to an NFC chipset, allowing for mobile payments. Additionally, external contact points 212 may be used to diagnose the mobile device, NFC chipset, or other components, may be used to upgrade software or firmware on the mobile device, etc. FIG. 2B shows an upper interface of a smart card tray, according to an exemplary embodiment of the present invention. Tray portion 220 incorporates smart card connections 222 that provide electrical coupling between a smart card and external contacts 212. Collectively, external contacts 212 form an outside interface. A smart card may be inserted into tray 220 such that the bottom surface of the smart card rests on the upper interface, with the contacts of the smart card being aligned with contacts 222. Contacts 222 replicate device connectors, such that the smart card communicates through the upper interface as if it were communicating with the mobile device. FIG. 2C shows the lower interface of tray portion 220, according to an exemplary embodiment of the present invention. The lower interface has contact points 224 that replicate the layout of the contacts on a bottom surface of a smart card. The mobile device therefore communicates with lower interface as it would with the smart card. Consequently, outside interface 212 provides electrical coupling to both the smart card and the smart card interface of a mobile device. The combination of upper and lower interfaces is designed to be such that tray portion 220 is thin enough to allow for easy installation and removal of the smart card tray and the smart card from the mobile device.

Figure 3:
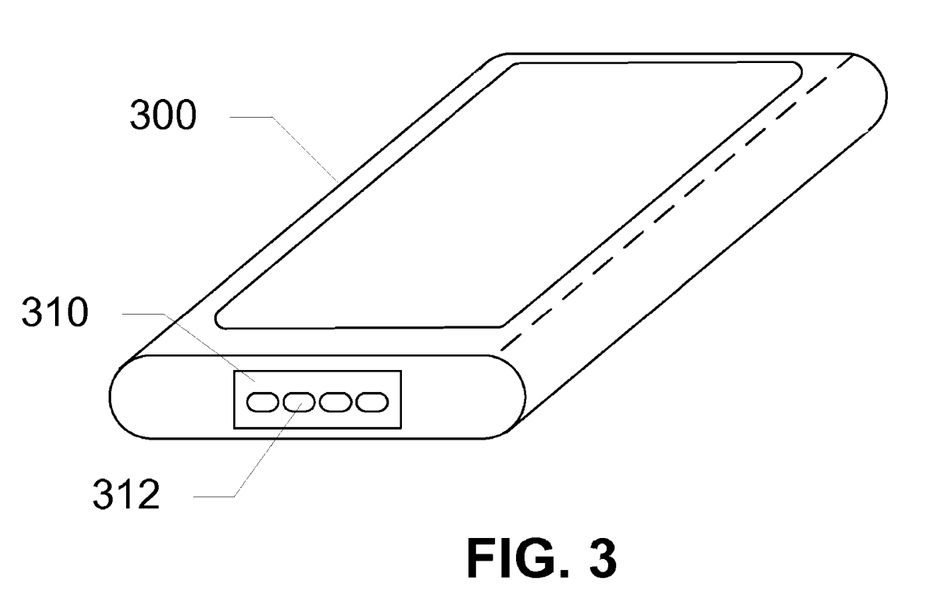
FIG. 3 shows an outside interface of a smart card tray inserted into a mobile device, according to an exemplary embodiment of the present invention.

FIG. 3 shows an outside interface 310 of a smart card tray inserted into a mobile device 300, according to an exemplary embodiment of the present invention. When fully inserted into mobile device 300, only outside surface 310 of the smart card tray is exposed. Contact points 312 form an outside interface for additional devices to be connected and to access a smart card within the smart card tray. Besides adding a whole new interface to existing mobile devices, the present invention also minimizes excess appendages and plugs protruding from mobile device 300, maintaining a streamlined form factor.

As described above, the novel outside interface provided by the present invention enables connection of several external accessories to a mobile device. This outside interface allows electrical access and therefore communication with a smart card, as well as the internal logic of the mobile device. According to one exemplary embodiment of the present invention, the outside interface is coupled to an NFC circuit, to enable a mobile device to communicate wirelessly with an NFC reader. Although the implementations of this are vast and varied, a few exemplary embodiments are highlighted below.

Figure 4A:
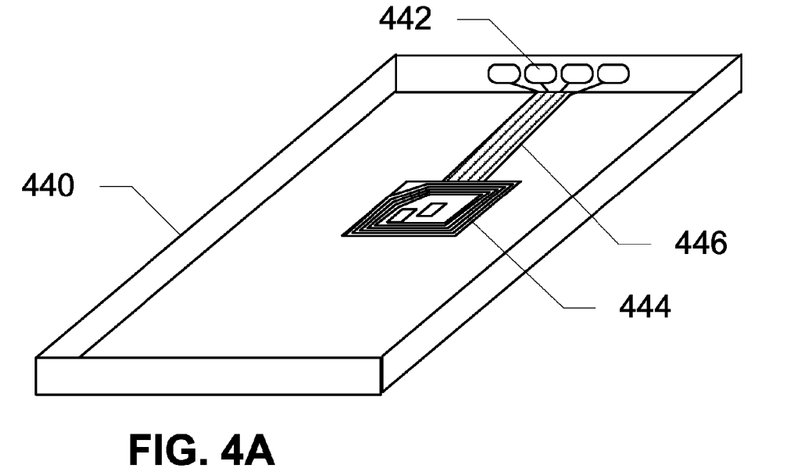
FIGS. 4A and 4B show a mobile device skin with an NFC circuit, according to an exemplary embodiment of the present invention.

FIGS. 4A and 4B show a mobile device skin with an NFC circuit, according to an exemplary embodiment of the present invention. According to the embodiment shown in FIG. 4A, embedded within skin 440 are secure contact points 442, a ribbon cable 446, and NFC circuitry 444. NFC circuitry 444 includes at least a central processing unit (CPU), a radio, and an antenna, such as the loop antenna shown. Contact points 442 are positioned within skin 440 such that they come into physical contact with the outside interface of a smart card tray when a mobile device containing the smart card tray is inserted into skin 440. Contact points 442 electronically connect to NFC circuit 444 using ribbon cable 446. The CPU controls the NFC radio/transceiver and antenna. Additionally, NFC circuitry 444 may comprise a secure element. The secure element serves as an access vault containing a unique identification of a user. For instance, a secure element may contain credit card information from the user, bank card information, gift card information, debit card information, digital keys, etc. The secure element holds this information in an encrypted form, said information being available to an authorized entity such as an NFC reader, or being transmitted with a user's permission, said permission being provided via a user interface on mobile device 400. Few entities actually gain access to any payment credentials within a secure element, as these payment credentials are sent to an RFID reader for payment. This ensures that the payment credentials are not stolen by an unauthorized user of mobile device 400. The radio transfers information through the antenna, and NFC circuitry 444 is embedded within skin 440 and may be, for instance, an RFID sticker or equivalent.

Figure 4B:
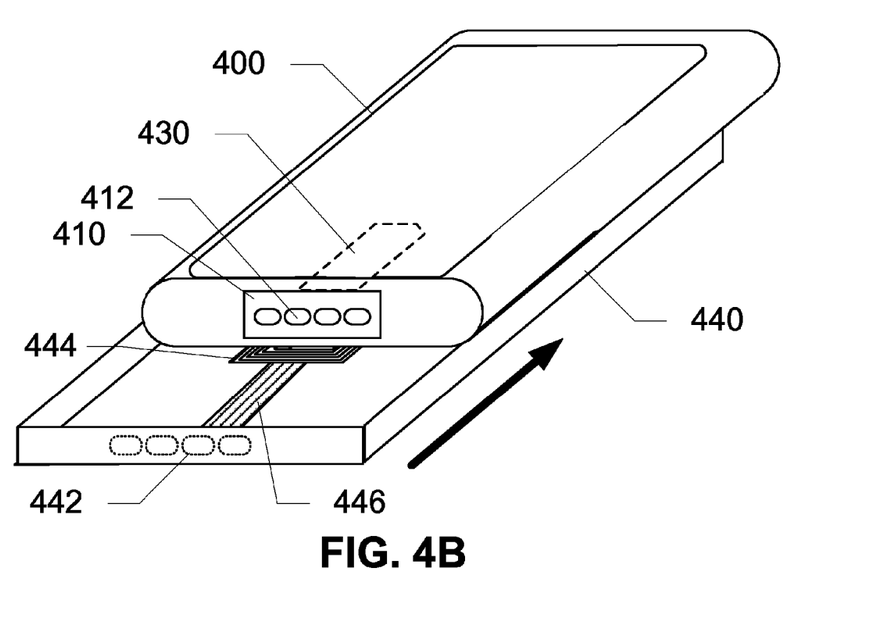

FIG. 4B shows skin 440 being worn over mobile device 400, according to an exemplary embodiment of the present invention. Skin 440 slides over mobile device 400 such that outside interface 412 on an exterior surface 410 of a smart card tray inserted within mobile device 400 are in electronic communication with contacts 442 on an inner surface of skin 440. This enables communication between a smart card 430 seated within the smart card tray, and NFC circuitry 444 via ribbon cable 446. Commands, signals, data, etc. from mobile device 400 can therefore be transmitted to an NFC reader or other devices wirelessly when skin 440 is worn. Further, power from mobile device 400 can be delivered to NFC circuitry 444 via outside interface 412.

The skin shown in FIGS. 4A and 4B is merely an example, and several other configurations of attaching NFC circuitry to a mobile device will become apparent to one having ordinary skill in the art in light of this disclosure. For instance, NFC circuitry can be embedded in a replacement cover of a mobile device. For instance, a clip-on or similar attachment with NFC circuitry can be coupled to an outside interface. In alternative embodiments of the present invention, rather than using skin contacts, the ribbon cable is tethered to the external contacts of the smart card tray. In these embodiments, an extra length of the ribbon cable must be included such that the skin may be coupled to the mobile device. This extra length of ribbon cable may be tucked into the skin.

Certain components of a mobile payment system may be located on a mobile device or its accessories, depending upon manufacturing considerations, etc. For instance, embodiments of the present invention may include a secure element within a smart card, on a memory of the mobile device, on a skin for the mobile device, etc. So long as there is electrical communication between the NFC circuitry and the smart card, placement of the secure element is flexible.

Figure 5A:
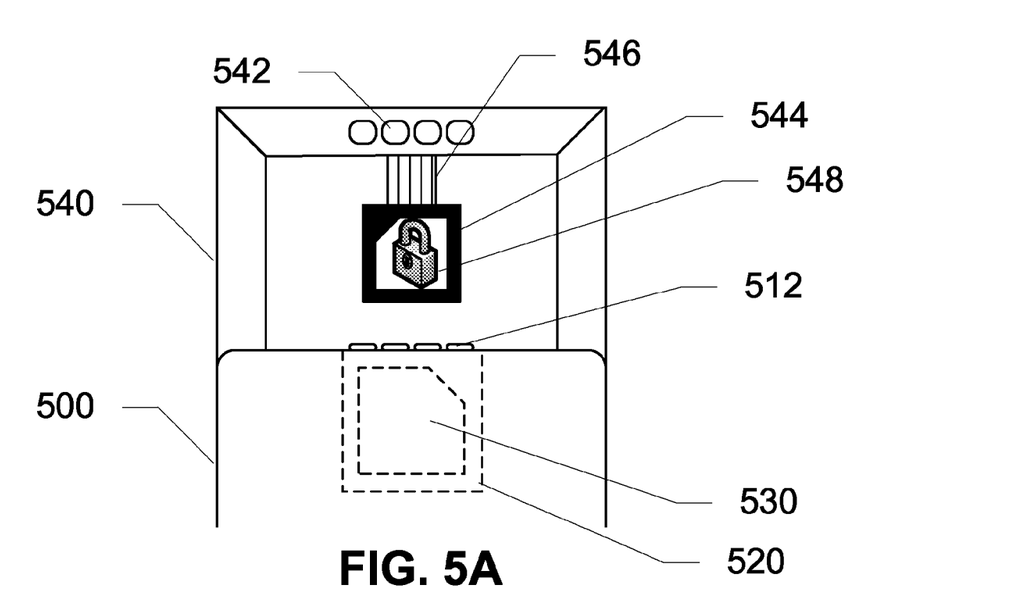
FIGS. 5A and 5B show possible locations of a secure element, according to an exemplary embodiment of the present invention.
Figure 5B:
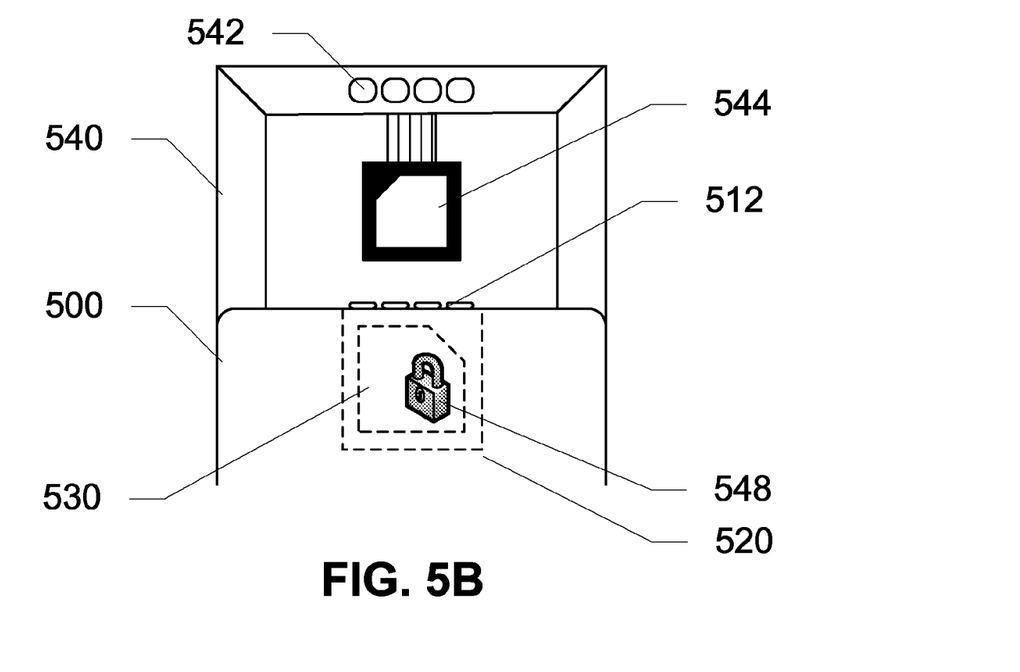

FIGS. 5A and 5B show placements of a secure element for an NFC-equipped mobile device, according to exemplary embodiments of the present invention. In FIG. 5A, a skin 540 is being shown as partially worn over a mobile device 500. Mobile device 500 includes a smart card tray with a tray portion 520, the smart card tray housing a smart card 530. The smart card tray further includes contact points that form an outside interface 512. Further, skin 540 includes contact points 542 that align with outside interface 512 when fully worn. Contact points 542 are electrically coupled to NFC circuit 544 and a secure element 548. NFC circuit 544 and secure element 548 are embedded within skin 540.

When a user decides to communicate with an external entity such as an NFC reader, a user interface enables the user to submit credentials stored on secure element 548. For instance, if the user is attempting a contactless payment, outside interface 512 on the smart card tray transmits payment instructions and a payment method from mobile device 500 to NFC circuit 544 on skin 540. NFC circuit 544 receives the payment method and payment instructions and requests encrypted user information from secure element 548 based upon the payment method. NFC circuit 544 receives the encrypted user information from secure element 548, and sends the encrypted user information and payment instructions through an antenna to a receiver, for instance, a POS terminal.

In FIG. 5B, NFC circuit 544 is embedded within a skin while mobile device 500 contains a smart card 530 within a smart card tray including a tray portion 520. However, in this embodiment a secure element 548 is also contained within smart card 530. When a user decides to make a mobile payment, payment instructions are created and a payment method is selected via a user interface on mobile device 500. Along with this information, smart card 530 requests the appropriate encrypted user information for the payment method from secure element 548, such as an account number, etc. Mobile device 500 then sends the payment instructions and the encrypted user information to NFC circuit 544 via outside interface 512 of smart card tray, contacts 542 and ribbon cable 546. NFC circuit 544 then transmits the payment instructions and the encrypted user information through an antenna to a reader on a POS device. In further embodiments of the present invention, some components may be manufactured within the mobile device while other components are located in the smart card or skin.

Credentials within the secure element are typically programmed or "provisioned" in the smart card or NFC circuitry by a service provider or manufacturer. The idea is to limit the access and modification of any secure element by any person unless explicitly authorized to do so. The present invention therefore also provides means to provision a secure element without having to resort to removing the element from the mobile device. In one exemplary embodiment, over-the-air (OTA) provisioning is employed to provision the secure element directly from the service provider. In another exemplary embodiment, a provisioning logic on a memory card issued to a service provider or authorized entity is used to provision the secure element. Therefore, the present invention incorporates a memory card reader into the mobile device skin.

Figure 6:
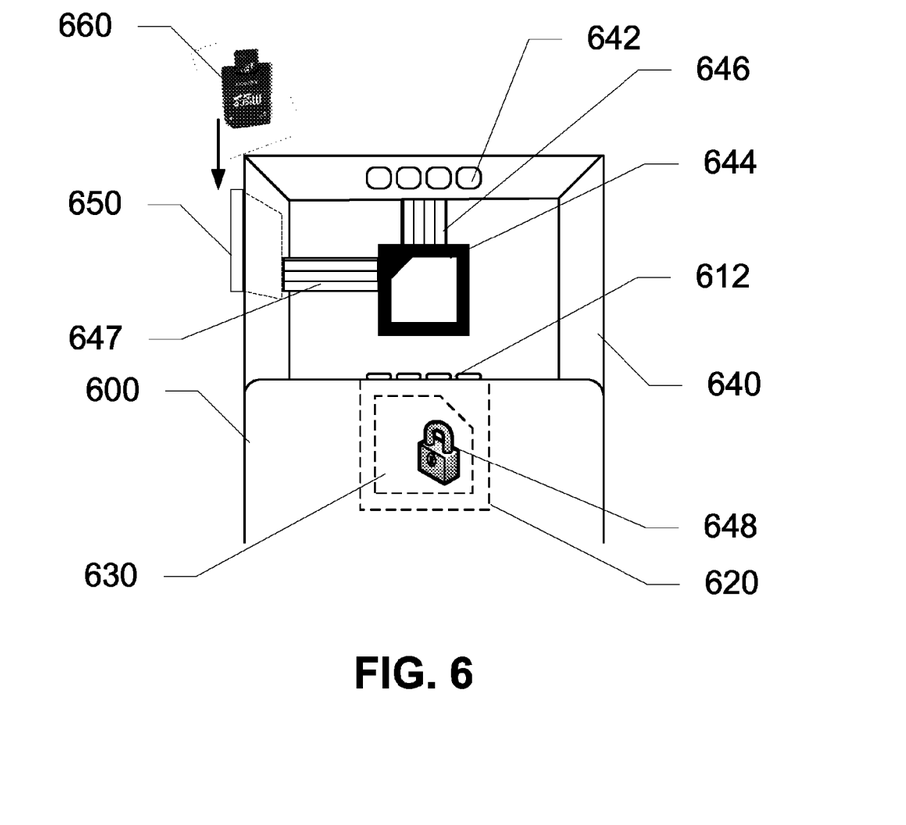
FIG. 6 shows a mobile device skin with an NFC circuit and a memory card reader, according to an exemplary embodiment of the present invention.

FIG. 6 shows a skin for a mobile device, the skin including a memory card slot, according to an exemplary embodiment of the present invention. In this embodiment, a memory card reader 650 is coupled to mobile device skin 640. Ribbon cable 647 or other connections between skin contacts 642 and NFC circuit 644 provide electrical communication to memory card reader 650. Memory card reader 650 provides an input for a memory card 660 that may be used in conjunction with mobile device 600. For instance, memory card reader 650 may accept a memory card 660 containing a provisioning logic for modifying a secure element. The provisioning logic can increase or decrease a value stored on secure element 648, edit, add and remove multiple user accounts, change identity information, etc. All that is required of the user is to take mobile device 600 with skin 640 into an authorized store or agent, and the authorized person would provision and/or deprovision features of secure element 648.

In a related embodiment, the present invention also allows for provisioning and deprovisioning services on the smart card via memory card reader 650. The electrical coupling provided by outside interface 612 means that authorized entities have access to not only secure element 648, but also to smart card 630 itself. Thus, a service provider or authorized agent can add or remove services related to a user's access of a network, and edit account information, etc., simply by using a combination of memory card reader 650 coupled to skin 640 in communication with smart card 630 positioned in a tray portion 620 via ribbon cable 646 and outside interface 612.

Alternative embodiments of the present invention may embed an inductive coil in the skin. In such embodiments, the mobile device may be laid over a charging station such that the mobile device charges inductively. The charging station creates an electromagnetic field which the inductive coil converts to electrical current for the mobile device. Embedding the inductive coil within the skin avoids bulky attachments otherwise necessary for inductive charging.

Figure 7:
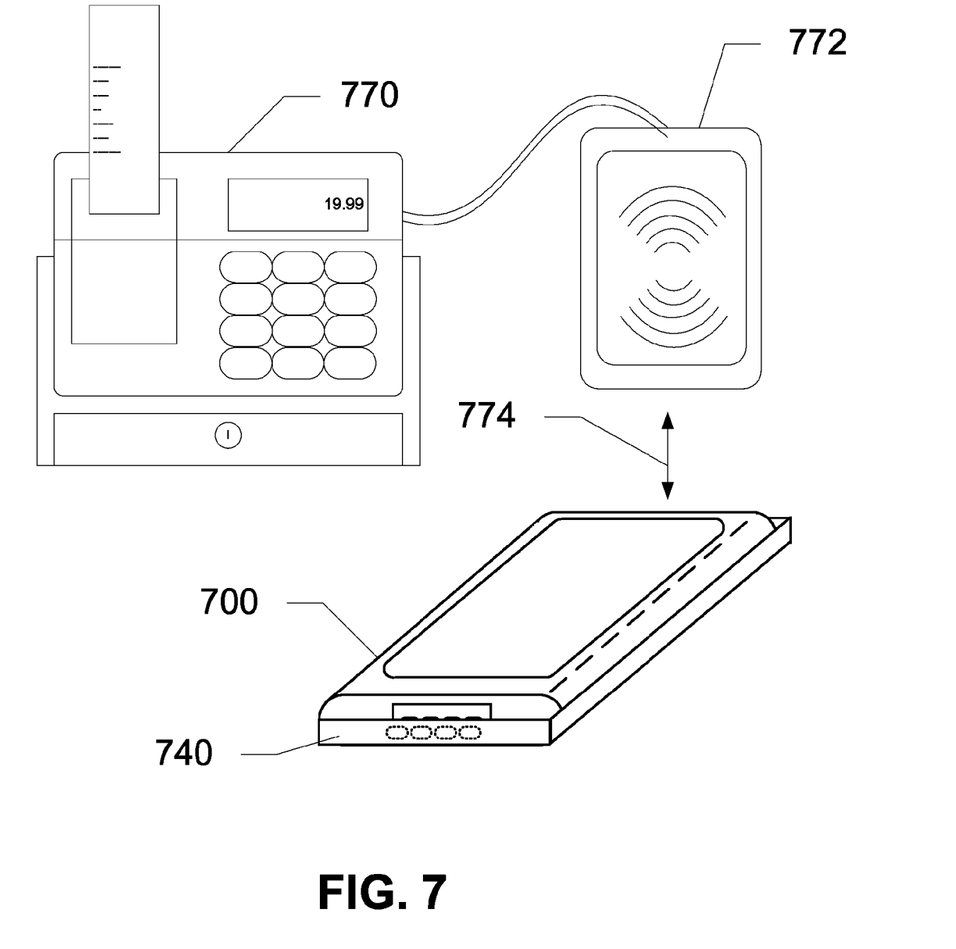
FIG. 7 shows a system for contactless payment using a mobile device, according to an exemplary embodiment of the present invention.

FIG. 7 shows a system for mobile payments, according to an exemplary embodiment of the present invention. In this embodiment, the system includes a mobile device 700 including a smart card tray with external contacts connected to a skin 740 having an NFC chipset. Mobile device 700 communicates payment information to a point of sale (POS) device 770 via a reader 772 connected to POS device 770. For example, a user may initiate a purchase at POS device 770. When the user is given the amount of the transaction, the user enters the amount into mobile device 700 or the amount is otherwise sent to mobile device 700. These steps can occur via a user interface such as a payment application stored on mobile device 700. The user confirms the amount and the payment method with the application on mobile device 700. Mobile device 700 transmits the payment confirmation and payment method to an NFC chipset embedded within skin 740, the sending occurring through the outside interface as described above. The NFC chipset receives the payment confirmation and payment method. The NFC chipset communicates the payment method to a secure element within skin 740. The secure element sends the appropriate encrypted user information, such as a credit card account, back to the NFC chipset. The NFC chipset then sends the encrypted user information and the payment confirmation to the receiver of the POS device via an NFC antenna. The transaction is then completed.

In alternative embodiments, the secure element is stored on a smart card on the mobile device itself. Multiple secure elements may be used to complete a transaction. When the user is finished with the transaction, the skin can be removed to prevent any unnecessary or unwanted NFC communication.

Figure 8:
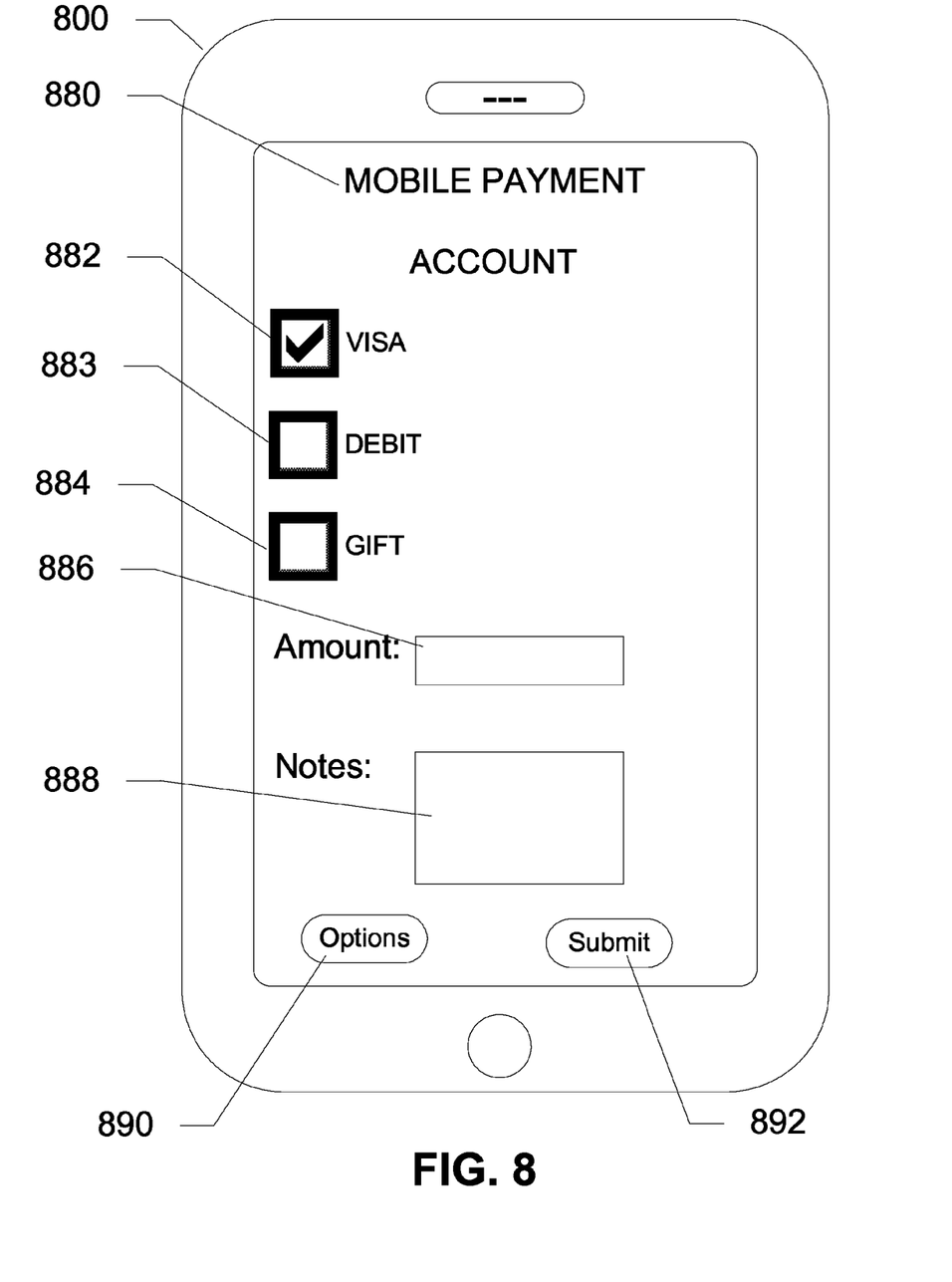
FIG. 8 shows a user interface for making a contactless payment, according to an exemplary embodiment of the present invention.

FIG. 8 shows an interface for making mobile transactions, according to an exemplary embodiment of the present invention. The interface could be a mobile wallet application, such as that in commonly assigned U.S. patent application Ser. No. 11/727,493, filed Mar. 27, 2007, which is hereby incorporated by reference herein in its entirety. With mobile wallet services, technology is embedded into mobile devices that allow the user to pay for goods and services in a retail environment. In the present embodiment, an application 880 includes payment methods 882-884, a payment amount field 886, a notes field 888, an options button 890, and a submit button 892. Payment methods 882-884 include a plurality of account selections, based upon accounts stored on a secure element. For instance, in this embodiment a visa account 882, a debit account 883, and a gift card account 884 are stored on the secure element. Visa account 882 has been selected, as represented by a check in the selection box for Visa account 882. Selection of an account may alternatively be made in a scroll menu, etc. Selection of certain accounts may require a password, with the user prompted for the password upon selection. A biometric identification such as voice, or fingerprint, can be used as an added security layer. Payment amount field 886 provides a field for the user to enter an amount of a payment to be made. The user may select from a currency when entering the amount. Notes field 888 allows the user to make notes concerning the transaction. Such notes may be stored on the mobile device 800, may be sent to the POS device, etc. Options button 890 provides the user with other options available, for instance, options available in the mobile wallet. Such options may allow the user to enable/disable mobile payments, set passwords for mobile payments, enter new payment methods, etc. Submit button 892 accepts the entries in all fields and submits a payment to an external NFC reader via a mobile device skin such as the one described above.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A near field communication (NFC) adapter for a mobile device, the adapter comprising:
    a tray for a smart card, the tray having an upper interface adapted to be in electrical communication with the smart card, and a lower interface in electrical communication with the upper interface and adapted to be in electrical communication with a smart card interface on the mobile device;
    an exterior panel fixedly coupled to the tray, the exterior panel having an outside interface on an outer surface, the outside interface being in electrical communication with the upper and lower interfaces via a plurality of contact leads; and
    a mobile device skin adapted to removably cover a portion of the mobile device, the mobile device skin including an NFC circuit in electrical communication with electrical contacts on an inner surface of the mobile device skin,
    wherein the electrical contacts of the mobile device skin are in electrical communication with the outside interface of the mobile device when the mobile device skin is covering the portion of the mobile device.

2. The adapter of claim 1, wherein the NFC circuit further comprises an NFC antenna, an NFC transceiver, and an NFC processor.

3. The adapter of claim 1, further comprising a secure element residing on one of the NFC circuit and the smart card in the tray.

4. The adapter of claim 3, wherein the secure element can be provisioned over the air via the smart card.

5. The adapter of claim 3, further comprising a memory card interface coupled to the mobile device skin, wherein the secure element can be provisioned via provisioning logic on a memory card in communication with the memory card interface.

6. The adapter of claim 3, wherein a user interface on the mobile device enables communication between the secure element and an NFC reader via the NFC circuit on the mobile device skin.

7. A device for providing an additional external interface on a mobile device, the device comprising:

a tray for a smart card adapted to be inserted into the mobile device, the tray having a top surface and a bottom surface;

an upper interface on the top surface adapted to be in electrical communication with the smart card;

a lower interface on the bottom surface in electrical communication with the upper interface and with a smart card interface of the mobile device;

an exterior panel coupled to the edge of the tray, the exterior panel having an outside interface on an outer surface, the outside interface being in electrical communication with the upper and lower interfaces via a plurality of contact leads.

8. The device of claim 7, wherein an external NFC circuit is removably coupled to the outside interface.

9. The device of claim 8, wherein the external NFC circuit is fixedly coupled to electrical contacts on a mobile device skin, the electrical contacts being adapted to be in electrical communication with the outside interface when the mobile device skin is used on the mobile device.

10. The device of claim 8, wherein the external NFC circuit further comprises an NFC antenna, an NFC transceiver, and an NFC processor.

11. The device of claim 8, wherein a secure element resides on one of the external NFC circuit and the smart card in the tray.

12. The device of claim 11, wherein the secure element can be provisioned over the air via the smart card.

13. The device of claim 11, wherein the secure element can be provisioned via a memory card interface incorporated within the mobile device skin.

14. The device of claim 11, wherein the mobile device includes an interface enabling a user to communicate with an NFC reader via the NFC antenna on the mobile device skin.

15. The device of claim 7, wherein the smart card can be provisioned via the outside interface.

16. A system for near field communication (NFC), comprising:

a mobile device having a user interface and a smart card interface;

a smart card tray for inserting a smart card into the smart card interface, the smart card tray having an exterior panel, the exterior panel having an outside interface that is in electrical communication with the smart card via contact leads;

an NFC circuit fixedly coupled to a mobile device skin, the NFC circuit coming into electrical communication with the outside interface when the mobile device skin is covering a portion of the mobile device; and an NFC reader in wireless communication with the mobile device via the NFC circuit on the mobile device skin.

17. The system of claim 16, further comprising a secure element residing on one of the NFC circuit and the smart card in the tray.

18. The system of claim 17, wherein the secure element can be provisioned over the air via the smart card.

19. The system of claim 17, further comprising a memory card interface coupled to the mobile device skin, wherein the secure element can be provisioned via provisioning logic on a memory card in communication with the memory card interface.

20. The system of claim 17, wherein the user interface on the mobile device enables communication between the secure element and the NFC reader via the NFC circuit on the mobile device skin.

* * * * *